(12) United States Patent
Grimm et al.

(10) Patent No.: US 12,313,413 B2
(45) Date of Patent: May 27, 2025

(54) NAVIGATION ROUTING FOR A VEHICLE

(71) Applicant: GM Global Technology Operations LLC, Detroit, MI (US)

(72) Inventors: Donald K. Grimm, Utica, MI (US); Talus Park, Dexter, MI (US); Tomislav Babic, Zagreb (HR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 375 days.

(21) Appl. No.: 18/055,127

(22) Filed: Nov. 14, 2022

(65) Prior Publication Data

US 2024/0159548 A1  May 16, 2024

(51) Int. Cl.
*G01C 21/34* (2006.01)

(52) U.S. Cl.
CPC .............................. *G01C 21/3461* (2013.01)

(58) Field of Classification Search
CPC .................................................. G01C 21/3461
See application file for complete search history.

(56) References Cited

U.S. PATENT DOCUMENTS

| | | | | |
|---|---|---|---|---|
| 9,477,894 B1* | 10/2016 | Reed | ..................... | G06V 20/586 |
| 10,331,141 B2 | 6/2019 | Grimm et al. | | |
| 2013/0222592 A1* | 8/2013 | Gieseke | ............ | G08G 1/096708 |
| | | | | 348/148 |
| 2015/0120178 A1* | 4/2015 | Kleve | ................. | G01C 21/3697 |
| | | | | 701/408 |
| 2016/0209230 A1* | 7/2016 | Nagy | .................. | G01C 21/3664 |
| 2016/0297360 A1* | 10/2016 | Smyth | ....................... | G08G 1/16 |
| 2017/0185089 A1* | 6/2017 | Mei | ....................... | G05D 1/0257 |
| 2018/0017398 A1* | 1/2018 | McNew | ............ | G01C 21/3453 |
| 2020/0180574 A1* | 6/2020 | Beckman | .................. | B60T 7/12 |
| 2020/0294385 A1* | 9/2020 | Lowe | .................... | G08B 25/005 |
| 2021/0224559 A1* | 7/2021 | Rider | .................... | B60C 23/002 |
| 2022/0357747 A1* | 11/2022 | Xia | ........................ | G05D 1/0214 |
| 2023/0249711 A1* | 8/2023 | Hardy | ..................... | G06F 30/20 |
| | | | | 701/24 |

FOREIGN PATENT DOCUMENTS

| | | | | |
|---|---|---|---|---|
| CN | 107438754 A | * | 12/2017 | ............ B60W 30/10 |
| DE | 102017124962 B4 | * | 8/2024 | ............. G08G 1/165 |

OTHER PUBLICATIONS

Russell et al., Optimizing the Analysis of Routing Oversize/Overweight Loads to Provide Efficient Freight Corridors, Jul. 2012 (Year: 2012).*
United States Patent and Trademark Office. U.S. Appl. No. 16/983,505, filed Aug. 3, 2020.

* cited by examiner

*Primary Examiner* — Donald J Wallace
*Assistant Examiner* — Jalal C Coduroglu
(74) *Attorney, Agent, or Firm* — Vivacqua Crane, PLLC

(57) ABSTRACT

A system for routing a vehicle based on clearance height of the vehicle includes a global navigation satellite system (GNSS) for determining a geographical location of the vehicle, a vehicle communication system for communicating with external systems, and a controller in electrical communication with the GNSS and the vehicle communication system. The controller is programmed to receive a navigation request from an occupant of the vehicle and determine a vehicle clearance height. The controller is further programmed to determine a navigation route using at least the GNSS and the vehicle communication system in response to receiving the navigation request, where the navigation route is based at least in part on the vehicle clearance height.

20 Claims, 4 Drawing Sheets

NAVIGATION ROUTING FOR A VEHICLE

INTRODUCTION

The present disclosure relates to systems and methods for navigation routing for a vehicle.

To increase occupant awareness, safety, and convenience, vehicles may be equipped with navigation systems which are configured to provide navigation directions to assist the occupant in navigating to a destination. Navigation systems may use satellite-based radio navigation systems to determine a location of the vehicle and use local or cloud-based maps to determine a route to the destination. When multiple routes are available, the navigation system may consider various factors, for example, route time, route length, traffic congestion, and fuel consumption to select an optimum or preferred route. However, current navigation systems may fail to account for additional factors which may affect occupant experience. Additionally, navigation systems may alert occupants of hazards present along a route, for example, railroad crossings or school zones. However, current navigation systems may fail to alert occupants of additional hazards which may affect occupant safety.

Thus, while current navigation systems and methods achieve their intended purpose, there is a need for a new and improved system and method for navigation routing for a vehicle.

SUMMARY

According to several aspects, a system for routing a vehicle based on clearance height of the vehicle is provided. The system includes a global navigation satellite system (GNSS) for determining a geographical location of the vehicle, a vehicle communication system for communicating with external systems, and a controller in electrical communication with the GNSS and the vehicle communication system. The controller is programmed to receive a navigation request from an occupant of the vehicle and determine a vehicle clearance height. The controller is further programmed to determine a navigation route using at least the GNSS and the vehicle communication system in response to receiving the navigation request, where the navigation route is based at least in part on the vehicle clearance height.

In another aspect of the present disclosure, to determine the vehicle clearance height, the controller is further programmed to determine a towing status of the vehicle, where the towing status includes a trailering status and a non-trailering status. To determine the vehicle clearance height, the controller is further programmed to request a height of a trailer connected to the vehicle from the occupant of the vehicle in response to determining that the towing status is the trailering status, wherein the vehicle clearance height is determined to be a larger of the height of the trailer and a height of the vehicle retrieved from a non-transitory memory of the controller. To determine the vehicle clearance height, the controller is further programmed to retrieve the height of the vehicle from the non-transitory memory of the controller in response to determining that the towing status is the non-trailering status, wherein the vehicle clearance height is determined to be the height of the vehicle.

In another aspect of the present disclosure, to determine the navigation route, the controller is further programmed to determine a plurality of possible routes which satisfy the navigation request using the GNSS. To determine the navigation route, the controller is further programmed to determine a route height comfort score for each of the plurality of possible routes using the vehicle communication system. To determine the navigation route, the controller is further programmed to select the navigation route from the plurality of possible routes based at least in part on the route height comfort score for each of the plurality of possible routes.

In another aspect of the present disclosure, to determine the route height comfort score for each of the plurality of possible routes, the controller is further programmed to establish a connection with a database using the vehicle communication system, where the database includes a clearance height for each of a plurality of obstacles located along each of the plurality of possible routes. To determine the route height comfort score for each of the plurality of possible routes, the controller is further programmed to retrieve the clearance height of each of the plurality of obstacles from the database. To determine the route height comfort score for each of the plurality of possible routes, the controller is further programmed to calculate an obstacle height comfort score for each of the plurality of obstacles located along each of the plurality of possible routes based on the vehicle clearance height and the clearance height for each of the plurality of obstacles. To determine the route height comfort score for each of the plurality of possible routes, the controller is further programmed to determine the route height comfort score for each of the plurality of possible routes based on the obstacle height comfort score for each of the plurality of obstacles located along each of the plurality of possible routes.

In another aspect of the present disclosure, the database is generated by aggregating a plurality of measurements of clearance heights for each of the plurality of obstacles measured by a plurality of vehicles.

In another aspect of the present disclosure, to calculate the obstacle height comfort score for each of the plurality of obstacles, the controller is further programmed to receive the obstacle height comfort score for each of the plurality of obstacles using the vehicle communication system, wherein the obstacle height comfort score for each of the plurality of obstacles is calculated using an obstacle height comfort score model:

$$C = \begin{cases} 1 - e^{-k*(h_o - h_v)}, & (h_o - h_v) > 0 \\ 0, & (h_o - h_v) \leq 0 \end{cases}$$

where C is the obstacle height comfort score for one of the plurality of obstacles, k is an obstacle height comfort score constant, $h_o$ is a clearance height of one of the plurality of obstacles, and $h_v$ is the vehicle clearance height.

In another aspect of the present disclosure, to calculate the obstacle height comfort score for each of the plurality of obstacles, the controller is further programmed to adjust the obstacle height comfort score constant based on feedback from the occupant of the vehicle.

In another aspect of the present disclosure, to adjust the obstacle height comfort score constant, the controller is further programmed to determine performance data of the vehicle while the vehicle is traversing at least one of the plurality of obstacles, where the performance data includes at least one of: braking, acceleration, velocity, and steering angle of the vehicle. To adjust the obstacle height comfort score constant, the controller is further programmed to adjust the obstacle height comfort score constant based on the performance data.

In another aspect of the present disclosure, to determine the route height comfort score for each of the plurality of possible routes, the controller is further programmed to determine the route height comfort score for each of the plurality of possible routes by summing the obstacle height comfort score of each of the plurality of obstacles located along each of the plurality of possible routes.

In another aspect of the present disclosure, the controller is further programmed to determine the obstacle height comfort score for a relevant obstacle using the GNSS and the vehicle communication system, where the relevant obstacle is an obstacle located within a predetermined distance threshold from the vehicle. The controller is further programmed to compare the obstacle height comfort score for the relevant obstacle to a predetermined obstacle height comfort score threshold. The controller is further programmed to notify the occupant of the vehicle of the obstacle height comfort score for the relevant obstacle in response to determining that the obstacle height comfort score for the relevant obstacle is less than or equal to the predetermined obstacle height comfort score threshold.

According to several aspects, a method for determining a navigation routing based on clearance height of a vehicle is provided. The method includes aggregating a plurality of clearance heights of a plurality of obstacles in a database, where the plurality of clearance heights is measured by a plurality of vehicles, where each of the plurality of vehicles is equipped with a vehicle sensor, and where the plurality of clearance heights is wirelessly transmitted to the database by the plurality of vehicles. The method also includes determining a navigation route for the vehicle based at least in part on the plurality of clearance heights of the plurality of obstacles in the database.

In another aspect of the present disclosure, determining the navigation route further may include receiving a navigation request from an occupant of the vehicle and determining a plurality of possible routes which satisfy the navigation request based at least in part on a location of the vehicle. Determining the navigation route further may include determining a route height comfort score for each of the plurality of possible routes. Determining the navigation route further may include selecting the navigation route from the plurality of possible routes based at least in part on the route height comfort score for each of the plurality of possible routes.

In another aspect of the present disclosure, determining the route height comfort score for each of the plurality of possible routes further may include establishing a connection with the database using a vehicle wireless communication system. Determining the route height comfort score for each of the plurality of possible routes further may include retrieving the clearance height of each of the plurality of obstacles located along each of the plurality of possible routes from the database. Determining the route height comfort score for each of the plurality of possible routes further may include calculating an obstacle height comfort score for each of the plurality of obstacles located along each of the plurality of possible routes based on a vehicle clearance height and the clearance height for each of the plurality of obstacles. Determining the route height comfort score for each of the plurality of possible routes further may include determining the route height comfort score for each of the plurality of possible routes based on the obstacle height comfort score for each of the plurality of obstacles located along each of the plurality of possible routes.

In another aspect of the present disclosure, calculating the obstacle height comfort score for each of the plurality of obstacles further may include calculating the obstacle height comfort score for each of the plurality of obstacles using an obstacle height comfort score model:

$$C = \begin{cases} 1 - e^{-k*(h_o - h_v)}, & (h_o - h_v) > 0 \\ 0, & (h_o - h_v) \leq 0 \end{cases}$$

where C is the obstacle height comfort score for one of the plurality of obstacles, k is an obstacle height comfort score constant, $h_o$ is a clearance height of one of the plurality of obstacles, and $h_v$ is the vehicle clearance height.

In another aspect of the present disclosure, the method further includes determining performance data of the vehicle while the vehicle is traversing at least one of the plurality of obstacles. The performance data includes at least one of: braking, acceleration, velocity, and steering angle of the vehicle. The method further includes adjusting the obstacle height comfort score constant based on the performance data.

In another aspect of the present disclosure, aggregating the plurality of clearance heights of the plurality of obstacles in the database further may include receiving a plurality of data packets from the plurality of vehicles, where each of the plurality of data packets includes a location and a clearance height of an obstacle. Aggregating the plurality of clearance heights of the plurality of obstacles in the database further may include determining an average clearance height for each obstacle based on the plurality of data packets. Aggregating the plurality of clearance heights of the plurality of obstacles in the database further may include storing a plurality of records in the database, where each of the plurality of records contains the location and the average clearance height of one of the plurality of obstacles.

In another aspect of the present disclosure, the method further includes determining an obstacle height comfort score of a relevant obstacle near the vehicle. The method further includes notifying an occupant of the vehicle in response to determining that the obstacle height comfort score of the relevant obstacle is less than or equal to a predetermined obstacle height comfort score threshold.

According to several aspects, a system for routing a vehicle based on clearance height of the vehicle is provided. The system includes a global navigation satellite system (GNSS) for determining a geographical location of the vehicle, a vehicle communication system for communicating with external systems, and a controller in electrical communication with the GNSS and the vehicle communication system. The controller is programmed to receive a navigation request from an occupant of the vehicle, determine a vehicle clearance height, and determine a plurality of possible routes which satisfy the navigation request using the GNSS. The controller is further programmed to establish a connection with a database using the vehicle communication system, where the database includes a clearance height for each of a plurality of obstacles located along each of the plurality of possible routes. The controller is further programmed to retrieve the clearance height of each of the plurality of obstacles from the database. The controller is further programmed to select a navigation route from the plurality of possible routes based at least in part on the vehicle clearance height and the clearance height of each of the plurality of obstacles located along each of the plurality of possible routes.

In another aspect of the present disclosure, to select the navigation route, the controller is further programmed to receive an obstacle height comfort score for each of the plurality of obstacles located along each of the plurality of possible routes using the vehicle communication system, where the obstacle height comfort score for each of the plurality of obstacles is calculated using an obstacle height comfort score model:

$$C = \begin{cases} 1 - e^{-k*(h_o - h_v)}, & (h_o - h_v) > 0 \\ 0, & (h_o - h_v) \le 0 \end{cases}$$

where C is the obstacle height comfort score for one of the plurality of obstacles, k is an obstacle height comfort score constant, $h_o$ is a clearance height of one of the plurality of obstacles, and $h_v$ is the vehicle clearance height. To select the navigation route, the controller is further programmed to determine a route height comfort score for each of the plurality of possible routes by summing the obstacle height comfort score of each of the plurality of obstacles located along each of the plurality of possible routes. To select the navigation route, the controller is further programmed to select the navigation route from the plurality of possible routes based at least in part on the route height comfort score for each of the plurality of possible routes.

In another aspect of the present disclosure, the system further includes a vehicle sensor for determining a clearance height for an obstacle. The controller is further programmed to determine a clearance height for an obstacle in an environment surrounding the vehicle using the vehicle sensor. The controller is further programmed to transmit the clearance height for the obstacle to a database using the vehicle communication system.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
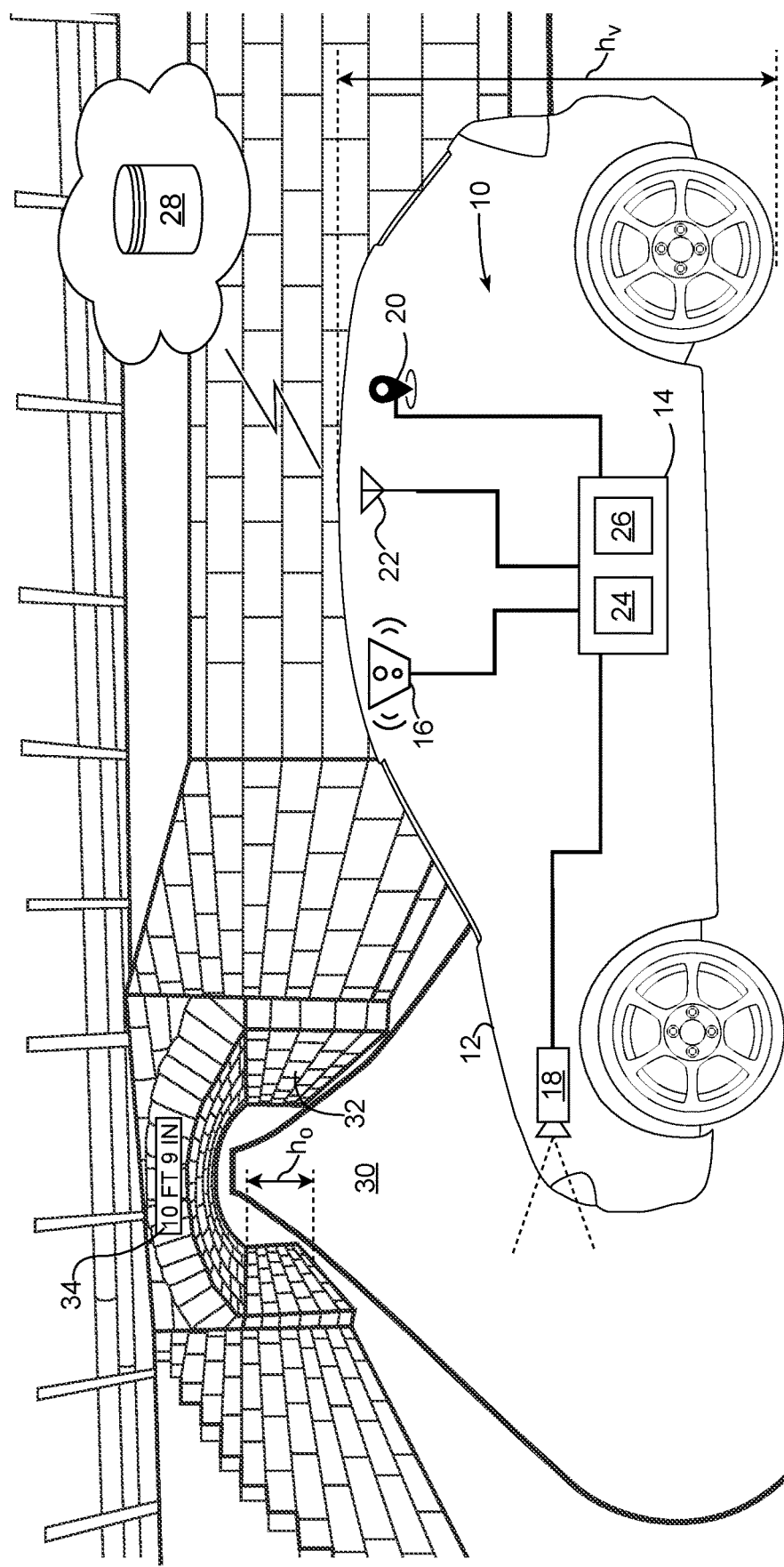
FIG. 1 is a schematic diagram of a system for routing based on clearance height of a vehicle according to an exemplary embodiment.

Referring to FIG. 1, a system for routing a vehicle based on clearance height of the vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. In the scope of the present disclosure, the vehicle 12 includes the vehicle 12 and any additional accessories which may affect a height of the vehicle 12 (e.g., roof racks, trailers, cargo, and the like). The system 10 generally includes a controller 14, a vehicle sensor (e.g., a LiDAR sensor 16 and/or a camera 18), a global navigation satellite system (GNSS) 20, and a vehicle communication system 22.

The controller 14 is used to implement methods 100 and 200 for determining a navigation route based on clearance height of a vehicle, as will be described below. The controller 14 includes at least one processor 24 and a non-transitory computer readable storage device or media 26. The processor 24 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 26 may include volatile and nonvolatile storage in read-only memory (ROM), random-access memory (RAM), and keep-alive memory (KAM), for example. KAM is a persistent or non-volatile memory that may be used to store various operating variables while the processor 24 is powered down. The computer-readable storage device or media 26 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the LiDAR sensor 16, the camera 18, GNSS 20, and the vehicle communication system 22. In an exemplary embodiment, the electrical communication is established using, for example, a CAN bus, a Wi-Fi network, a cellular data network, or the like. It should be understood that various additional wired and wireless techniques and communication protocols for communicating with the controller 14 are within the scope of the present disclosure.

The LiDAR sensor 16 is used to measure a distance between multiple points in an environment surrounding the vehicle 12. In an exemplary embodiment, the LiDAR sensor 16 works by targeting points in the environment with a laser and measuring a time required for reflected light from the laser to return to the LiDAR sensor 16. Use of alternative and/or additional ranging sensors, such as, for example, ultrasonic ranging sensors, radar sensors, and/or time-of-flight sensors is within the scope of the present disclosure. The LiDAR sensor 16 is in electrical communication with the controller 14 as described above.

The camera 18 is used to capture images and/or videos of the environment surrounding the vehicle 12. In an exemplary embodiment, the camera 18 is a photo and/or video camera which is positioned to view the environment surrounding the vehicle 12. In one example, the camera 18 is affixed inside of the vehicle 12, for example, in a headliner of the vehicle 12. In another example, the camera 18 is affixed outside of the vehicle 12, for example, on a front bumper of the vehicle 12, having a view of the environment surrounding the vehicle 12. It should be understood that cameras having distance measuring capabilities, such as, for example, stereo cameras, are included in the scope of the present disclosure. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The GNSS 20 is used to determine a geographical location of the vehicle 12. In an exemplary embodiment, the GNSS 20 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. It should be understood that various additional types of satellite-based radionavigation systems, including additional types of global navigation satellite systems (GNSS) are within the scope of the present disclosure.

The vehicle communication system 22 is used by the controller 14 to communicate with other systems external to the vehicle 12. For example, the vehicle communication system 22 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 22 is a wireless communication system configured to communicate via a wireless local area network (WLAN) using IEEE 802.11 standards or by using cellular data communication. However, additional or alternate communication methods, such as a dedicated short-range communications (DSRC) channel and/or mobile telecommunications protocols based on the $3^{rd}$ Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 22 may include one or more antennas and/or communication transceivers for receiving and/or transmitting signals, such as cooperative sensing messages (CSMs). The vehicle communication system 22 is configured to wirelessly communicate information between the vehicle 12 and another vehicle. Further, the vehicle communication system 22 is configured to wirelessly communicate information between the vehicle 12 and infrastructure or other vehicles.

Figure 2A:
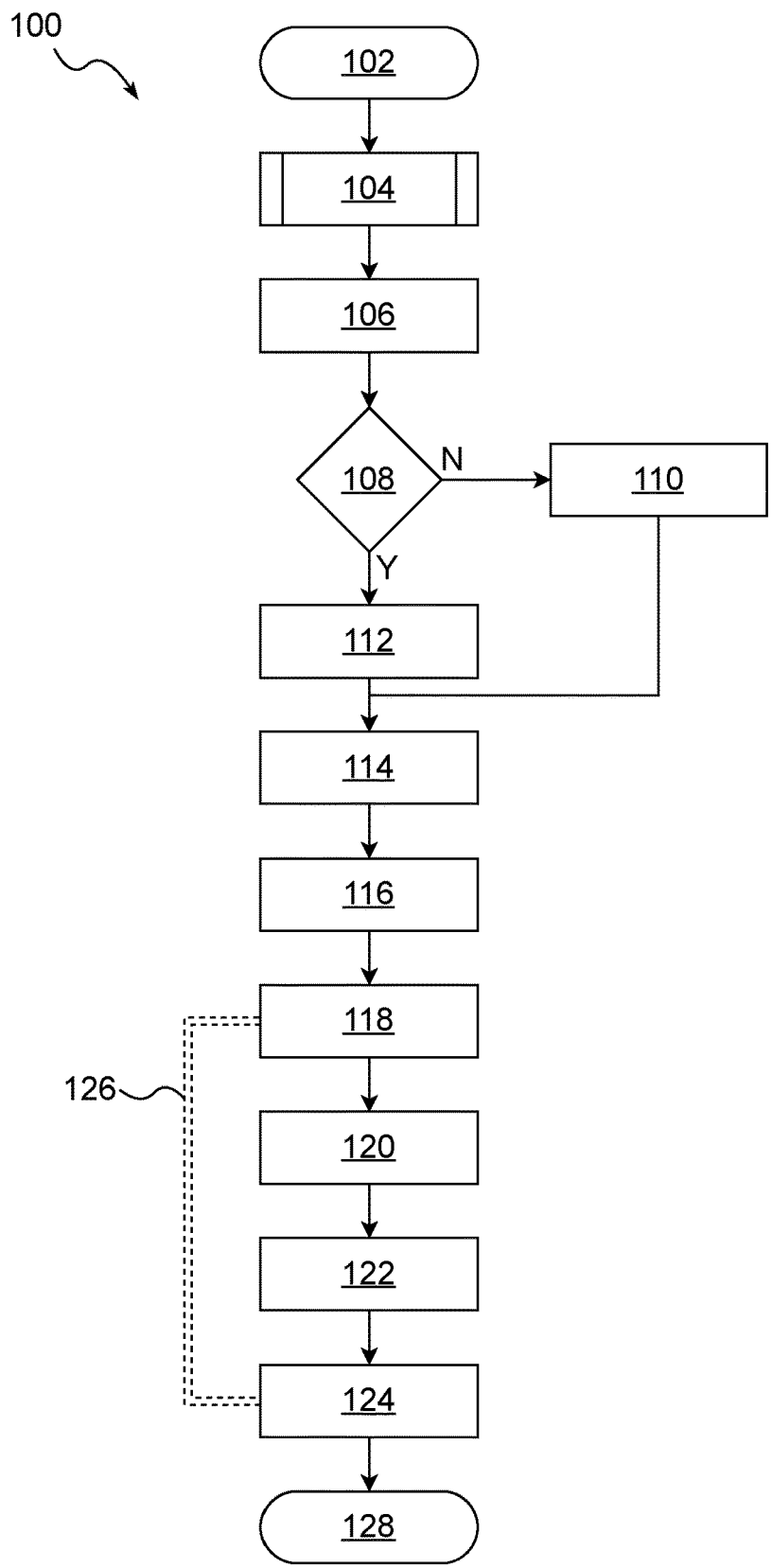
FIG. 2A is a flowchart of a method for routing based on clearance height of a vehicle according to a first exemplary embodiment.

Referring to FIG. 2A, a flowchart of the method 100 for routing based on clearance height of a vehicle is shown. The method 100 begins at block 102 and proceeds to block 104. At block 104, a database 28 (shown in FIGS. 1 and 3) is populated with a plurality of clearance heights of a plurality of obstacles. In the scope of the present disclosure, an obstacle is an object (e.g., a tree branch, an underpass 32 as shown in FIG. 1, or other structure) which is located above a roadway 30 (shown in FIG. 1) and which may interfere with vehicles traveling on the roadway 30. A clearance height is a maximum height of a vehicle which may traverse (i.e., travel underneath) an obstacle (e.g., the underpass 32) without colliding with the obstacle. Block 104 will be discussed in greater detail in reference to FIG. 3 below. After block 104, the method 100 proceeds to block 106.

At block 106, the controller 14 receives a navigation request from an occupant of the vehicle 12. In the scope of the present disclosure, the navigation request is a request made by the occupant of the vehicle to use the GNSS 20 to provide navigation directions to a requested destination. In a non-limiting example, the occupant of the vehicle 12 may use a human-machine interface (not shown) of the vehicle 12 to input a requested destination in the form of a street address. After block 106, the method 100 proceeds to block 108.

At block 108, the controller 14 determines a towing status of the vehicle 12. In the scope of the present disclosure, the towing status the vehicle 12 defines whether a trailer is currently connected to the vehicle 12. If a trailer is currently connected to the vehicle 12, the towing status is a trailering status. If a trailer is not currently connected to the vehicle 12, the towing status is a non-trailering status. In an exemplary embodiment, to determine the towing status of the vehicle 12, the controller 14 determines whether an electrical connection is present between the vehicle 12 and a trailer. In another exemplary embodiment, the controller 14 uses the human-machine interface (not shown) to prompt the occupant for the towing status of the vehicle 12. If no trailer is currently connected to the vehicle 12 (i.e., the non-trailering status), the method 100 proceeds to block 110. If a trailer is currently connected to the vehicle 12 (i.e., the trailering status), the method 100 proceeds to block 112.

At block 110, a vehicle clearance height is determined to be a height of the vehicle 12. In the scope of the present disclosure, the vehicle clearance height is a height of the vehicle 12 and/or the height of a trailer connected to the vehicle 12. The height of the vehicle 12 is retrieved from the media 26 of the controller 14. In the scope of the present disclosure, the height of the vehicle 12 is measured between a point where a tire of the vehicle 12 contacts the roadway 30 and a highest point of the vehicle 12 (e.g., a roof of the vehicle 12, a cargo attached to the roof of the vehicle 12, or the like). After block 110, the method 100 proceeds to block 114.

At block 112, the controller 14 requests a height of the trailer which is currently connected to the vehicle 12 from the occupant of the vehicle 12. In an exemplary embodiment, the controller 14 uses the human-machine interface (not shown) of the vehicle 12 to display a prompt to the occupant of the vehicle 12 requesting the height of the trailer. If the height of the trailer is less than the height of the vehicle 12 stored in the media 26 of the controller 14, the vehicle clearance height is determined to be the height of the vehicle 12 stored in the media 26 of the controller 14. If the height of the trailer is greater than or equal to the height of the vehicle 12 stored in the media 26 of the controller 14, the vehicle clearance height is determined to be the height of the as provided by the occupant of the vehicle 12. After block 112, the method 100 proceeds to block 114.

At block 114, the controller 14 uses the GNSS 20 to determine a plurality of possible routes which satisfy the navigation request received at block 106. In an exemplary embodiment, the GNSS 20 is used to determine a location of the vehicle 12, and the plurality of possible routes is determined using a map saved in the GNSS 20, the media 26 of the controller 14, and/or an external system and retrieved using the vehicle communication system 22. After block 114, the method 100 proceeds to block 116.

At block 116, the controller 14 establishes a connection with the database 28 and retrieves the clearance height for each of a plurality of obstacles (e.g., the underpass 32) located along each of the plurality of possible routes determined at block 114. In an exemplary embodiment, for each possible route of the plurality of possible routes, the database 28 is searched for any obstacles having a location along the possible route, and the clearance height is retrieved for all obstacles located along the possible route. After block 116, the method 100 proceeds to block 118.

At block 118, the controller 14 retrieves an obstacle height comfort score for each of the plurality of obstacles (e.g., the underpass 32) along each of the plurality of routes using the vehicle communication system 22. In the scope of the present disclosure, the obstacle height comfort score is a quantification of a predicted comfort level of the occupant of the vehicle 12 while traversing a given obstacle. For example, if the clearance height of an obstacle (e.g., the underpass 32) is very similar to the vehicle clearance height the occupant of the vehicle 12 may have a low comfort level. In an exemplary embodiment, to calculate the obstacle height comfort score for each of the plurality of obstacles along each of the plurality of routes, the controller 14 uses the following obstacle height comfort score model:

$$C = \begin{cases} 1 - e^{-k*(h_o - h_v)}, & (h_o - h_v) > 0 \\ 0, & (h_o - h_v) \leq 0 \end{cases}$$

wherein C is the obstacle height comfort score for one of the plurality of obstacles, k is an obstacle height comfort score constant, $h_o$ is a clearance height of one of the plurality of obstacles, and $h_v$ is the vehicle clearance height. It should be understood that determination of the obstacle height comfort score may be performed on an external system (e.g., a server computer) and transmitted to the controller 14 using the vehicle communication system 22. In another exemplary embodiment, determination of the obstacle height comfort score is preformed using the controller 14.

In the scope of the present disclosure, the obstacle height comfort score constant is a value which is used to adjust the response of the obstacle height comfort score model. In a non-limiting example, the obstacle height comfort score constant is between 0.5 and 2.0, inclusive. In an exemplary embodiment, the obstacle height comfort score constant is adjusted based on feedback from the occupant of the vehicle, as will be discussed below. After block 118, the method 100 proceeds to block 120.

At block 120, a route height comfort score is determined for each of the plurality of routes based on the obstacle height comfort score for each of the plurality of obstacles located along each of the plurality of possible routes. In the scope of the present disclosure, the route height comfort score is a quantification of a predicted comfort level of the occupant of the vehicle 12 with traveling along a given possible route. For example, if the given possible route includes many obstacles having relatively low obstacle height comfort scores, the occupant may be less comfortable traveling along the given possible route than for a possible route having obstacles with relatively high obstacle height comfort scores. In an exemplary embodiment, to determine the route height comfort score of each of the plurality of possible routes, the controller 14 sums, for each possible route of the plurality of possible routes, the obstacle height comfort scores for obstacles along that possible route as determined at block 118. After block 120, the method 100 proceeds to block 122.

At block 122, one of the plurality of possible routes is selected as a navigation route based at least in part on the route height comfort score for each of the plurality of possible routes determined at block 120. In the scope of the present disclosure, the navigation route is one of the plurality of routes which is selected as an optimal route to be presented to the occupant of the vehicle 12 to accommodate the navigation request received at block 106. It should be understood that various factors in addition to the route height comfort score may be used to select the navigation route, for example, traffic conditions, lane edge condition (i.e., condition of lane markings or road shoulder), road grade, propulsion stress (i.e., actual or occupant perceived stress to an engine or electric motor of the vehicle 12), and turn complexity (e.g., high turning angle, complex intersection geometry, and the like) along each of the plurality of possible routes. After block 122, the method 100 proceeds to block 124.

At block 124, the obstacle height comfort score constant is adjusted based on feedback from the occupant of the vehicle 12. In an exemplary embodiment, the controller 14 determines performance data of the vehicle 12 while traversing a given obstacle (e.g., the underpass 32). In a non-limiting example, the performance data includes braking, acceleration, velocity, and steering angle data. Use of additional types of vehicle performance data are within the scope of the present disclosure. By analyzing the performance data, the controller 14 may determine an adjustment to the obstacle height comfort score constant. For example, if the occupant brakes heavily when traversing the given obstacle (e.g., the underpass 32) and the obstacle height comfort score for the given obstacle is above a predetermined threshold, the obstacle height comfort score constant is reduced. Therefore, when the obstacle height comfort score for the given obstacle is recalculated with the lower obstacle height comfort score constant, the obstacle height comfort score of the given obstacle is below the predetermined threshold. In another exemplary embodiment, the controller 14 uses the human-machine interface (not shown) to prompt the occupant of the vehicle 12 to determine a comfort level of the occupant of the vehicle 12 while traversing the given obstacle. In yet another exemplary embodiment, the occupant directly adjusts the obstacle height comfort score constant using the human-machine interface (not shown). The connection line 126 illustrates feedback between block 124 and block 118 to adjust the object height comfort score constant. After block 124, the method 100 proceeds to enter a standby state at block 128.

Figure 2B:
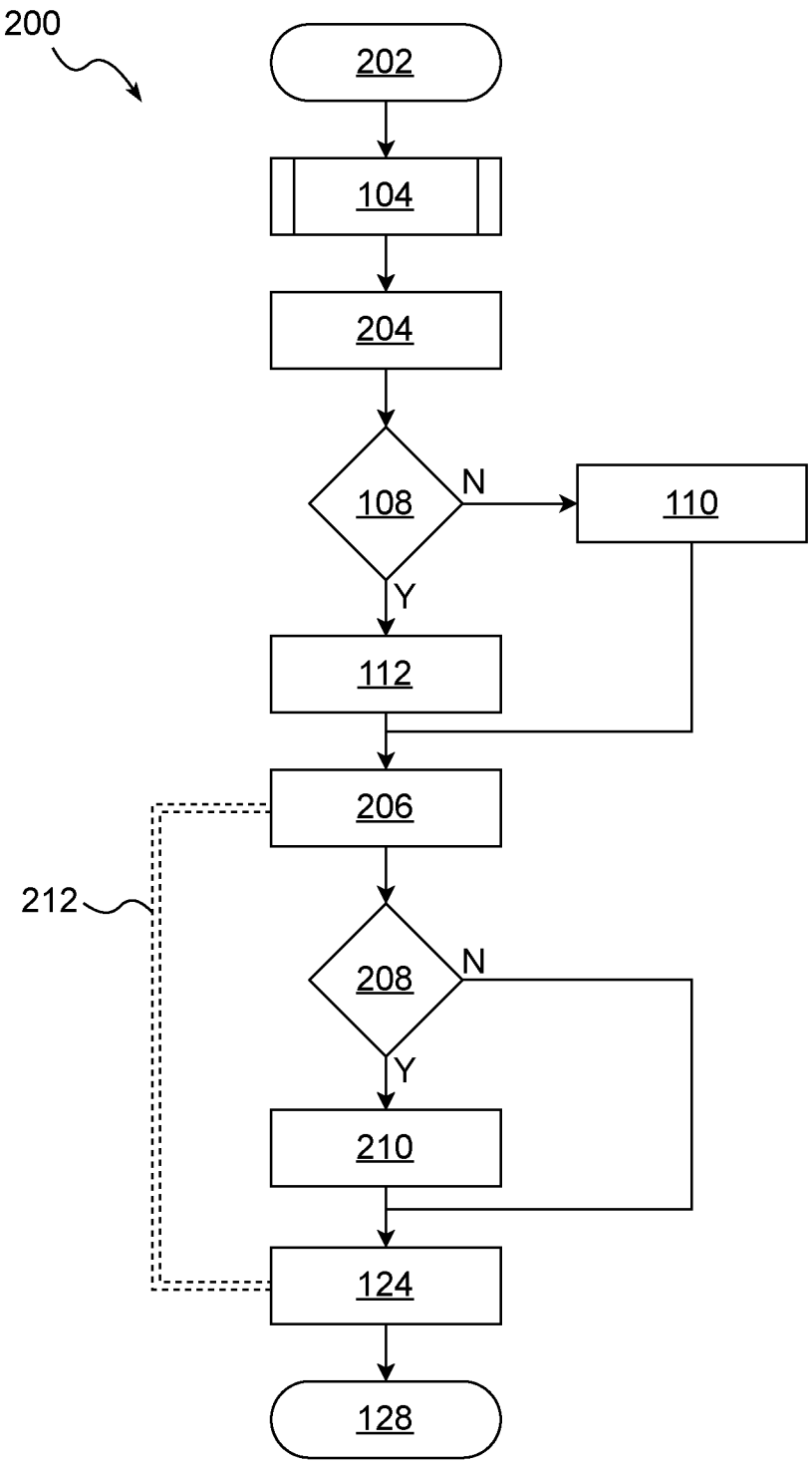
FIG. 2B is a flowchart of a method for routing based on clearance height of a vehicle according to a second exemplary embodiment.

Referring to FIG. 2B, a flowchart of method 200 for routing based on clearance height of a vehicle is shown. The method 200 is an additional embodiment of a method for routing based on clearance height of a vehicle. The method 200 shares similarities with the method 100. Thus, like blocks are denoted with like reference numbers, and the descriptions in reference to FIG. 2A above apply to like-numbered blocks of the method 200. The method 200 begins at block 202 and proceeds to block 104 as described above in reference to FIG. 2A. After block 104, the method 200 proceeds to block 204.

At block 204, the controller 14 identifies a relevant obstacle using at least one of the LiDAR sensor 16, the camera 18, and the GNSS 20. In the scope of the present disclosure, the relevant obstacle is an obstacle located along the roadway 30 upon which the vehicle 12 is traveling, for example, the underpass 32 shown in FIG. 1. In an exemplary embodiment, at least one of the LiDAR sensor 16 and the camera 18 is used to scan the environment surrounding the vehicle 12 to identify the relevant obstacle. In another exemplary embodiment, the GNSS 20 is used to monitor the location of the vehicle 12 and the vehicle communication system 22 is used to find obstacles near the vehicle 12 using the database 28. After block 204, the method 200 proceeds to block 108, as described above in reference to FIG. 2A. After block 108, the method 200 proceeds to either block 110 or block 112, as described above in reference to FIG. 2A. After either block 110 or block 112, the method 200 proceeds to block 206.

At block 206, the obstacle height comfort score for the relevant obstacle identified at block 204 is determined. In an exemplary embodiment, the vehicle communication system 22 is used to establish a connection with the database 28, and the clearance height of the relevant obstacle is retrieved from the database 28. In another exemplary embodiment, at least one of the LiDAR sensor 16 and the camera 18 is used to determine the clearance height of the relevant obstacle. In a non-limiting example, the LiDAR sensor 16 measures the clearance height of the relevant obstacle. In another non-limiting example, the camera 18 captures an image of a height sign 34 (shown in FIG. 1) of the relevant obstacle and uses an optical character recognition algorithm to determine the clearance height of the relevant obstacle based on the image of the height sign 34. After the clearance height of the relevant obstacle is determined, the obstacle height comfort score model is used to determine the obstacle height comfort score of the relevant obstacle as described above. After block 206, the method 200 proceeds to block 208.

At block 208, the obstacle height comfort score of the relevant obstacle determined at block 206 is compared to a predetermined obstacle height comfort score threshold (e.g., 0.5). If the obstacle height comfort score of the relevant obstacle is greater than the predetermined obstacle height comfort score threshold, the method 200 bypasses block 210 and proceeds to block 124. If the obstacle height comfort score of the relevant obstacle is less than or equal to the predetermined obstacle height comfort score threshold, the method 200 proceeds to block 210.

At block 210, the controller 14 notifies the occupant of the vehicle 12 of the obstacle height comfort score for the relevant obstacle. In an exemplary embodiment, the controller 14 uses the human-machine interface (not shown) of the vehicle 12 to notify the occupant. In a non-limiting example, the controller 14 uses at least one of a dashboard display (not shown), a head-up display (not shown), a haptic feedback seat (not shown), and an audible alert to notify the occupant of the vehicle 12. After block 210, the method 200 proceeds to block 124 as described about in reference to FIG. 2A. The connection line 212 illustrates feedback between block 124 of the method 200 and block 206 to adjust the object height comfort score constant. After block 124, the method 200 proceeds to enter the standby state at block 128.

In an exemplary embodiment, the controller 14 repeatedly exits the standby state 128 and restarts the methods 100 and/or 200. In a non-limiting example, the controller 14 exits the standby state 128 and restarts the methods 100 and/or 200 on a timer, for example, every three hundred milliseconds.

Figure 3:
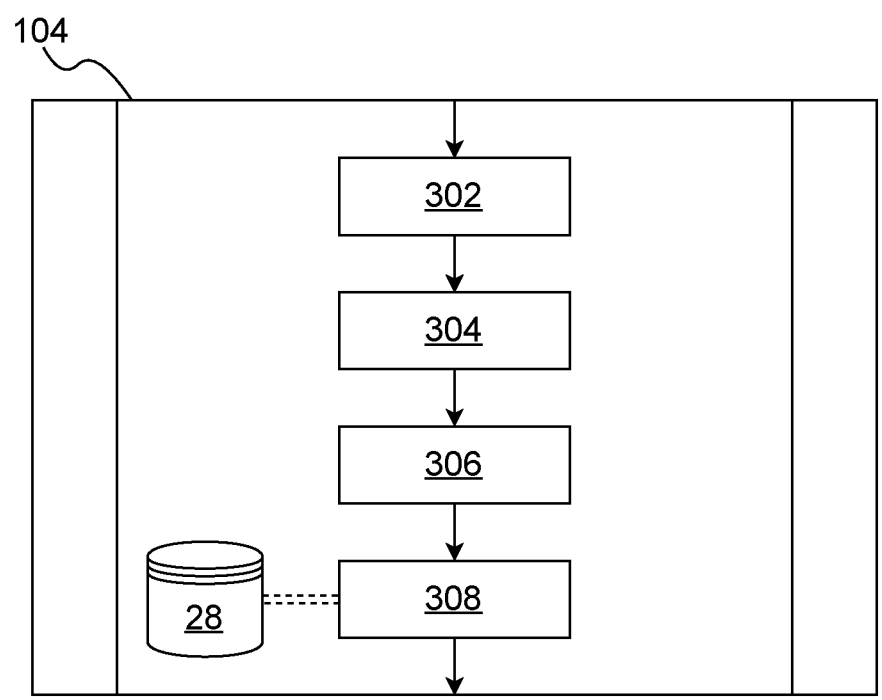
FIG. 3 is a flowchart of a method for populating a database with a plurality of clearance heights of a plurality of obstacles according to an exemplary embodiment.

Referring to FIG. 3, a flowchart of an exemplary embodiment of the block 104 discussed above is provided. The exemplary embodiment of block 104 begins at block 302. At block 302, a plurality of vehicles equipped with at least one of a ranging sensor (e.g., the LiDAR sensor 16) and a camera (e.g., the camera 18) are used to perform a plurality of measurements of a plurality of obstacles. Each of the plurality of vehicles is also equipped with a communication system (e.g., the vehicle communication system 22) for communicating with the database 28 and a GNSS system (e.g., the GNSS 20) for determining location. In an exemplary embodiment, each of the plurality of vehicles measures obstacles (e.g., the underpass 32) using the ranging sensor and records a clearance height and a location for each obstacle identified. In another exemplary embodiment, each of the plurality of vehicles captures images of height signs 34 of obstacles and uses an optical character recognition algorithm to determine the clearance height of the obstacles based on images of height signs 34. In non-limiting example, after one of the plurality of vehicles determines a clearance height and location of an obstacle, a data packet containing a location and a clearance height for each measured obstacle is transmitted to the database 28. After block 302, the exemplary embodiment of block 104 proceeds to block 304.

At block 304, the database 28 receives a plurality of data packets from the plurality of vehicles, each data packet including a location and a clearance height for an obstacle. In an exemplary embodiment, the data packet includes additional information, such as, for example, an image of a height sign 34 for the obstacle, and/or a mathematical function describing a shape of the obstacle. After block 304, the exemplary embodiment of block 104 proceeds to block 306.

At block 306, an average clearance height is determined for each obstacle based on the plurality of data packets received at block 304. In an exemplary embodiment, for each unique location in the plurality of received data packets, an average value of all clearance heights is calculated. After block 306, the exemplary embodiment of block 104 proceeds to block 308.

At block 308, a plurality of records is stored in the database 28. In an exemplary embodiment, each of the plurality of records contains at least a location of an obstacle and the average value of all clearance heights measured for the obstacle as determined at block 306. It should be understood that the database 28 may be implemented using various means, including, for example, an object-oriented database, a relational database, a key-value database, and the like. After block 308, the exemplary embodiment of block 104 is completed.

The system 10 and methods 100, 200 of the present disclosure offer several advantages. By creating and maintaining the database 28 as described above in reference to block 104, the database 28 may be frequently populated and updated by a plurality of vehicles, leading to increased coverage and accuracy. Additionally, calculating a route height comfort score for a plurality of routes allows occupant comfort to be increased by selecting a route which is more comfortable for the occupant, using, for example, the method 100. In an additional advantage, the method 200 notifies the occupant of obstacles with low height comfort scores, increasing occupant awareness and mitigating opportunities for collision.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for routing a vehicle based on clearance height of the vehicle, the system comprising:
   a global navigation satellite system (GNSS) for determining a geographical location of the vehicle;
   a vehicle communication system for communicating with external systems; and
   a controller in electrical communication with the GNSS and the vehicle communication system, wherein the controller is programmed to:
   receive a navigation request from an occupant of the vehicle;
   determine a vehicle clearance height; and
   determine a navigation route using at least the GNSS and the vehicle communication system in response to receiving the navigation request, wherein the navigation route is based at least in part on the vehicle clearance height, and wherein to determine the navigation route, the controller is further programmed to:
   determine a plurality of possible routes which satisfy the navigation request using the GNSS;
   establish a connection with a database using the vehicle communication system, wherein the database includes a clearance height for each of a plurality of obstacles located along each of the plurality of possible routes;
   retrieve the clearance height of each of the plurality of obstacles from the database;
   receive an obstacle height comfort score for each of the plurality of obstacles using the vehicle communication system, wherein the obstacle height comfort score for each of the plurality of obstacles is calculated using an obstacle height comfort score model:

$$C = \begin{cases} 1 - e^{-k*(h_o - h_v)}, & (h_o - h_v) > 0 \\ 0, & (h_o - h_v) \le 0 \end{cases}$$

wherein C is the obstacle height comfort score for one of the plurality of obstacles, k is an obstacle height comfort score constant, $h_o$ is a clearance height of one of the plurality of obstacles, and $h_v$ is the vehicle clearance height;
   determine a route height comfort score for each of the plurality of possible routes based on the obstacle height comfort score for each of the plurality of obstacles located along each of the plurality of possible routes; and
   select the navigation route from the plurality of possible routes based at least in part on the route height comfort score for each of the plurality of possible routes.

2. The system of claim 1, wherein to determine the vehicle clearance height, the controller is further programmed to:
   determine a towing status of the vehicle, wherein the towing status includes a trailering status and a non-trailering status;
   request a height of a trailer connected to the vehicle from the occupant of the vehicle in response to determining that the towing status is the trailering status, wherein the vehicle clearance height is determined to be a larger of the height of the trailer and a height of the vehicle retrieved from a non-transitory memory of the controller; and
   retrieve the height of the vehicle from the non-transitory memory of the controller in response to determining that the towing status is the non-trailering status, wherein the vehicle clearance height is determined to be the height of the vehicle.

3. The system of claim 2, wherein to determine the towing status of the vehicle, the controller is further programmed to:
   determine the towing status of the vehicle based at least in part on a status of an electrical connection between the vehicle and the trailer.

4. The system of claim 1, wherein the database is generated by aggregating a plurality of measurements of clearance heights for each of the plurality of obstacles measured by a plurality of vehicles.

5. The system of claim 4, wherein the plurality of measurements of clearance heights are determined by measuring a clearance height of each of the plurality of obstacles using a ranging sensor of one or more of the plurality of vehicles.

6. The system of claim 4, wherein the plurality of measurements of clearance heights are determined by determining a clearance height of each of the plurality of obstacles using an imaging sensor of one or more of the plurality of vehicles to capture one or more images of a height sign of the one or more of the plurality of obstacles.

7. The system of claim 4, wherein the database is generated by averaging one or more of the plurality of measurements of clearance heights from the plurality of vehicles to determine the clearance height for each of the plurality of obstacles.

8. The system of claim 1, wherein to calculate the obstacle height comfort score for each of the plurality of obstacles, the controller is further programmed to:
   adjust the obstacle height comfort score constant based on feedback from the occupant of the vehicle.

9. The system of claim 8, wherein to adjust the obstacle height comfort score constant, the controller is further programmed to:
   determine performance data of the vehicle while the vehicle is traversing at least one of the plurality of obstacles, wherein the performance data includes at least one of: braking, acceleration, velocity, and steering angle of the vehicle; and
   adjust the obstacle height comfort score constant based on the performance data.

10. The system of claim 1, wherein to determine the route height comfort score for each of the plurality of possible routes, the controller is further programmed to:
    determine the route height comfort score for each of the plurality of possible routes by summing the obstacle height comfort score of each of the plurality of obstacles located along each of the plurality of possible routes.

11. The system of claim 1, wherein the controller is further programmed to:

determine the obstacle height comfort score for a relevant obstacle using the GNSS and the vehicle communication system, wherein the relevant obstacle is an obstacle located within a predetermined distance threshold from the vehicle;

compare the obstacle height comfort score for the relevant obstacle to a predetermined obstacle height comfort score threshold; and notify the occupant of the vehicle of the obstacle height comfort score for the relevant obstacle in response to determining that the obstacle height comfort score for the relevant obstacle is less than or equal to the predetermined obstacle height comfort score threshold.

12. A method for determining a navigation routing based on clearance height of a vehicle, the method comprising:

aggregating a plurality of clearance heights of a plurality of obstacles in a database, wherein the plurality of clearance heights is measured by a plurality of vehicles, wherein each of the plurality of vehicles is equipped with a vehicle sensor, and wherein the plurality of clearance heights is wirelessly transmitted to the database by the plurality of vehicles; and determining a navigation route for the vehicle based at least in part on the plurality of clearance heights of the plurality of obstacles in the database, wherein determining the navigation route further comprises:

receiving a navigation request from an occupant of the vehicle;

determining a plurality of possible routes which satisfy the navigation request based at least in part on a location of the vehicle;

establishing a connection with the database using a vehicle wireless communication system;

retrieving the clearance height of each of the plurality of obstacles located along each of the plurality of possible routes from the database;

calculating an obstacle height comfort score for each of the plurality of obstacles using an obstacle height comfort score model:

$$C = \begin{cases} 1 - e^{-k*(h_o - h_v)}, & (h_o - h_v) > 0 \\ 0, & (h_o - h_v) \leq 0 \end{cases}$$

wherein C is the obstacle height comfort score for one of the plurality of obstacles, k is an obstacle height comfort score constant, $h_o$ is the clearance height of one of the plurality of obstacles, and $h_v$ is a vehicle clearance height;

determining a route height comfort score for each of the plurality of possible routes based on the obstacle height comfort score for each of the plurality of obstacles located along each of the plurality of possible routes; and selecting the navigation route from the plurality of possible routes based at least in part on the route height comfort score for each of the plurality of possible routes.

13. The method of claim 12, further comprising:

determining performance data of the vehicle while the vehicle is traversing at least one of the plurality of obstacles, wherein the performance data includes at least one of: braking, acceleration, velocity, and steering angle of the vehicle; and adjusting the obstacle height comfort score constant based on the performance data.

14. The method of claim 12, wherein aggregating the plurality of clearance heights of the plurality of obstacles in the database further comprises:

receiving a plurality of data packets from the plurality of vehicles, wherein each of the plurality of data packets includes a location and a clearance height of an obstacle;

determining an average clearance height for each obstacle based on the plurality of data packets; and storing a plurality of records in the database, wherein each of the plurality of records contains the location and the average clearance height of one of the plurality of obstacles.

15. The method of claim 12, further comprising:

determining an obstacle height comfort score of a relevant obstacle near the vehicle; and notifying an occupant of the vehicle in response to determining that the obstacle height comfort score of the relevant obstacle is less than or equal to a predetermined obstacle height comfort score threshold.

16. The method of claim 12, further comprising determining the vehicle clearance height, wherein determining the vehicle clearance height further comprises:

determining a towing status of the vehicle, wherein the towing status includes a trailering status and a non-trailering status;

determining the vehicle clearance height to be a larger of the height of a trailer and a height of the vehicle in response to determining that the towing status is the trailering status; and determining the vehicle clearance height to be the height of the vehicle in response to determining that the towing status is the non-trailering status.

17. The method of claim 12, wherein aggregating the plurality of clearance heights further comprises:

aggregating the plurality of clearance heights of the plurality of obstacles in the database, wherein the plurality of clearance heights is measured by the plurality of vehicles, wherein each of the plurality of vehicles is equipped with the vehicle sensor, and wherein the vehicle sensor is a ranging sensor.

18. The method of claim 12, wherein aggregating the plurality of clearance heights further comprises:

aggregating the plurality of clearance heights of the plurality of obstacles in the database, wherein the plurality of clearance heights is measured by the plurality of vehicles, wherein each of the plurality of vehicles is equipped with the vehicle sensor, and wherein the vehicle sensor is an imaging sensor configured to capture one or more images of a height sign of the one or more of the plurality of obstacles.

19. A system for routing a vehicle based on clearance height of the vehicle, the system comprising:

a global navigation satellite system (GNSS) for determining a geographical location of the vehicle;

a vehicle communication system for communicating with external systems;

a vehicle sensor for determining a clearance height for an obstacle; and a controller in electrical communication with the GNSS, the vehicle sensor, and the vehicle communication system, wherein the controller is programmed to:

receive a navigation request from an occupant of the vehicle;

determine a vehicle clearance height;

determine a plurality of possible routes which satisfy the navigation request using the GNSS;

establish a connection with a database using the vehicle communication system, wherein the database includes a clearance height for each of a plurality of obstacles located along each of the plurality of possible routes;

retrieve the clearance height of each of the plurality of obstacles from the database; and select a navigation route from the plurality of possible routes based at least in part on the vehicle clearance height and the clearance height of each of the plurality of obstacles located along each of the plurality of possible routes, wherein to select the navigation route, the controller is further programmed to:

receive an obstacle height comfort score for each of the plurality of obstacles located along each of the plurality of possible routes using the vehicle communication system, wherein the obstacle height comfort score for each of the plurality of obstacles is calculated using an obstacle height comfort score model:

$$C = \begin{cases} 1 - e^{-k*(h_o - h_v)}, & (h_o - h_v) > 0 \\ 0, & (h_o - h_v) \le 0 \end{cases}$$

wherein C is the obstacle height comfort score for one of the plurality of obstacles, k is an obstacle height comfort score constant, $h_o$ is a clearance height of one of the plurality of obstacles, and $h_v$ is the vehicle clearance height:

determine a route height comfort score for each of the plurality of possible routes by summing the obstacle height comfort score of each of the plurality of obstacles located along each of the plurality of possible routes; and select the navigation route from the plurality of possible routes based at least in part on the route height comfort score for each of the plurality of possible routes;

measure the clearance height of one or more of the plurality of obstacles using the vehicle sensor; and transmit the clearance height of the one or more of the plurality of obstacles to the database using the vehicle communication system.

20. The system of claim 19, wherein the database is configured to receive the clearance height of the one or more of the plurality of obstacles from the vehicle communication system and store the clearance height of the one or more of the plurality of obstacles in the database.

* * * * *